Nov. 26, 1940.  D. V. EDWARDS  2,223,031
METHOD OF EVACUATING A VESSEL AND MAKING A VITREOUS SEAL
Original Filed Dec. 19, 1935  2 Sheets-Sheet 1
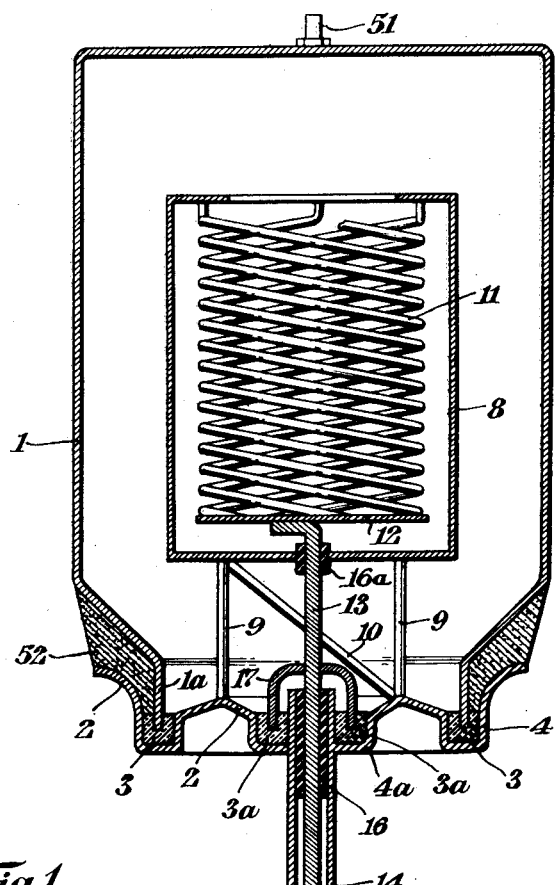
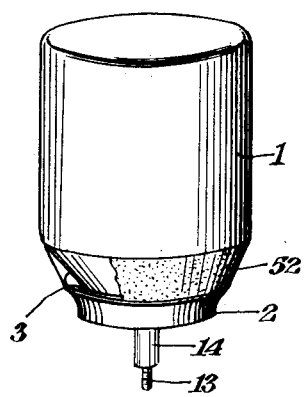
Inventor
Donald V. Edwards
By Edwards, Bower & Pool
Attorneys

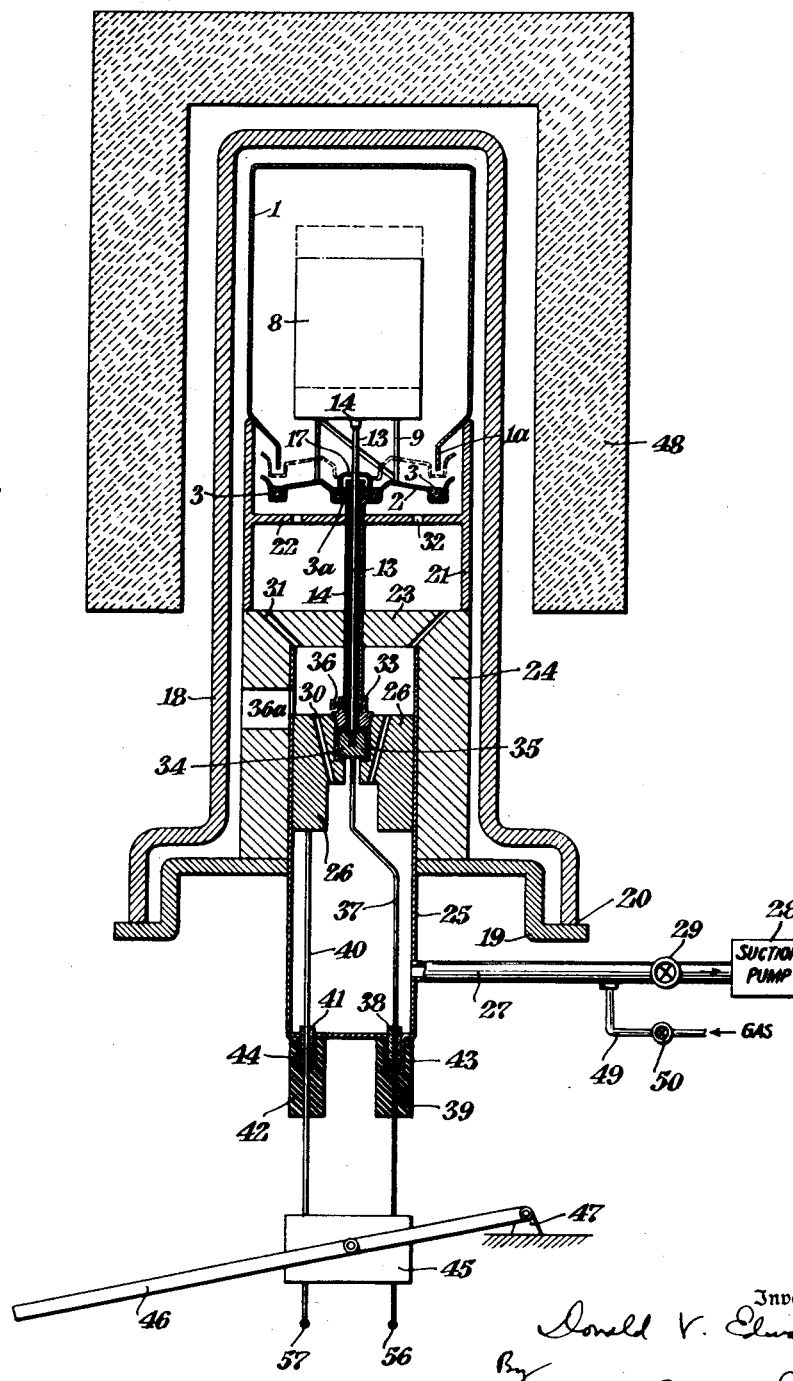

Patented Nov. 26, 1940

2,223,031

UNITED STATES PATENT OFFICE 2,223,031

METHOD OF EVACUATING A VESSEL AND MAKING A VITREOUS SEAL

Donald V. Edwards, Montclair, N. J., assignor to Electrons, Inc., a corporation of Delaware Original application December 19, 1935, Serial No. 55,230. Divided and this application August 25, 1939, Serial No. 291,851

4 Claims. (Cl. 176—2)

This invention relates to devices for evacuating and sealing multi-part metallic envelopes for vacuum tubes.

This is a division of my copending application, Serial No. 55,230, filed December 19, 1935.

Heretofore in the evacuation of devices of this character it has been customary to heat the vessel while pumping the gas therefrom, but although the release of the absorbed gas from the electrodes and other parts of the tube is greatly accelerated by heating, the higher the temperature the faster the rate of release, the temperature to which it has been possible, in the past, to raise the parts has been limited by the softening of the vitreous seals which are used to seal conducting leads into the vessel. Consequently, in practice the heating temperature has been held below the softening point of the seal, with the result that an undesirably large amount of gas still remains.

In accordance with this invention it is permissible to raise the temperature considerably above the melting point of the vitreous seal while subjecting the device to a vacuum, thereby attaining a discharge device from which much more of the gas is removed than has heretofore been possible.

The vessel is divided into two parts, one of which may carry or serve as an electrode of one polarity, and the other of which may carry or serve as an electrode of opposite polarity. These two parts, with or without electrodes, have registering surfaces so that when brought together a complete vessel will be formed.

In carrying out my method I separate these two portions and apply a vitreous substance to at least one of the surfaces. While in this separated condition the parts are enclosed in a suitable vacuum chamber and heated to a temperature above that at which the vitreous substance will melt. At the same time the chamber is evacuated in the usual manner, and after evacuation the two portions of the vessel are brought together in such manner that one part dips into the molten vitreous substance and completely seals the two parts together. The parts are then allowed to cool under vacuum until the vitreous substance solidifies, after which the complete vessel may be removed from the heating chamber.

The sealing compound should be a substance which is stable and has a temperature coefficient somewhere near or higher than that of the metal to be sealed, and should also create an elastic, tough glass or vitreous material having the property of not frothing under heat and vacuum, and not rupturing while or after cooling.

In practice, any suitable vitreous substance may be employed, such for example as one comprising $SiO_2$, 28% by weight; $Na_2SiO_3 \cdot 5H_2O$, 53% by weight; and $Fe_3O_4$, 19% by weight. Preferably, this vitreous substance in the form of a frit is melted at atmospheric pressure and placed in a peripheral trough in one of the portions of the vessel where it is melted under the vacuum and afterward hardens to create a seal for sealing the two parts of the vessel together.

I have found that the temperature of heating, rather than the time of pumping, is the important factor in the degassing, because raising the temperature a few degrees liberates from the walls as much of the obnoxious substances in a few minutes as will pumping a great many hours without the increase in temperature.

The invention is not confined to the use of any particular apparatus for carrying it into effect. However, a convenient apparatus for practicing the invention is shown in my Patent No. 2,173,473, granted September 19, 1939.

Fig. 1 is a perspective view of a discharge device having a metal base dish sealed to a metal shell by a glass seal, according to this invention, a portion of the outer seal being broken away;

Fig. 2 is a cross-section of the device shown in Fig. 1, illustrating the interior parts of the tube and the manner of sealing the tube after evacuation;

Fig. 3 illustrates a furnace and means by which the device of Figs. 1 and 2 may be exhausted and sealed.

Referring to the drawings the outer shell of the tube comprises two complementary metallic parts 1 and 2 preferably steel adapted to be joined by suitable sealing material 3 which preferably insulates the parts 1 and 2 from each other. One of the parts, preferably the bottom part 2, carries the tube elements and is provided with a suitable receptacle, such as the trough 4, for the sealing material. In Fig. 2 only two elements, a cathode 11 and a heat shield 8, are shown, the part 1 serving as the anode, and the device as a whole operating as a rectifier only. Obviously other elements, such as a control grid or grids may also be mounted on part 2, or the parts may be arranged on either part 1 or part 2 to suit individual conditions. In the drawings the heat shield 8 of the can type is supported on the bottom 2 by uprights 9, cross braced by brace 10, preferably welded to the support and shield. The cathode element 11 of suitable material, such as nickel, comprises one or more spirals of wire, one end of each spiral being welded to the upper end of the heat shield and the lower ends being welded to a plate 12, electrically connected to a conductor 13, insulated from the heat shield by insulation 16a, and from the bottom 2 by insulation 16, whereby a heating circuit exists from conductor 13, spirals 11, heat shield 8, support 9 and bottom 2, to terminal 14 comprising an extension tube formed on bottom 2.

The conductor 13 carries a bell-shaped portion 17 adapted to be immersed in the insulating medium 3a carried in the receptacle 4a formed in the bottom 2.

It will be seen that by lowering the bottom 2, as shown in Fig. 3, the depending rim 1—a of part 1, will be raised above the insulation, thus opening the interior of the tube to the atmosphere.

The apparatus for degassing the tube comprises a suitable chamber adapted to be heated by suitable means and evacuated by a pump, the chamber being provided with suitable means for supporting the tube in opened condition, e. g., bottom lowered as shown in Fig. 3. Such a chamber is provided by the bell 18 of quartz or other material impervious to air or gas and adapted to withstand a high temperature. The bell is mounted on a base plate 19, preferably of metal, to which it may be sealed by a waxed or greased ground joint at 20. A metal cylinder 21 having a horizontal strengthening web 22 is provided for supporting the shell, as shown. The lower end of cylinder 21 rests on the head 23 of a supporting cylinder 24, preferably of quartz, which is mounted on the base plate 19. A metal cylindrical sleeve 25, closed at the lower end in a manner to retain a vacuum within the sleeve, and having a metal plug or crosshead 26 adapted to slide within it, is positioned within cylinder 24 and through the base plate 19, to which it is welded. The sleeve 25 is provided with an exhausting pipe 27 adapted to be connected with a vacuum pump 28 through a valve 29. The closed sleeve and the bell are adapted to be evacuated by the pump; and to equalize the pressure in the bell and sleeve there are provided vents 30, 31 and 32, respectively through members 26, 23 and 22.

The tube with its bottom 2 lowered is placed on the supporting cylinder 21 and with the tube 14 protruding downwardly through centrally located openings in the web 22 and cross head 26. The end of the tube 14 is fitted into a collar 33 threaded into the crosshead 26, and the conductor 13 is threaded into a block 34 insulated from the crosshead 26 by insulating material 35. The tube 14 is then held in place by a set screw 36, a suitable opening 36a being provided to give access through support 24 and sleeve 25 thereto.

A conductor 37 welded to block 34 passes down through a suitable insulator 38 and through a close fitting rubber hose 39, in which 38 is mounted, to the outer atmosphere, and a similar rod 40 extends down from the crosshead 26 through a similarly mounted insulator 41 and rubber hose 42. The hoses 39 and 42 are of the type known as vacuum hose; they fit tightly over the respective depending mouths 43 and 44 of the sleeve 25 integral with the base of the sleeve 25, and fit snugly around the rods 37 and 40 in a manner to permit vertical movement of the rods through the hoses without permitting the entry of gas into the sleeve 25. The outer ends of rods 37 and 40 are attached to a block 45 operable in a vertical direction by a lever 46 pivoted to a fulcrum 47 so that the rods 37 and 40 may be moved upwardly or downwardly through the vacuum hose to move the crosshead 26 in a vertical direction.

A furnace 48 is supported above the vacuum bell and adapted to be lowered over and around the part of the bell within which is located the shell and dish. Details of the furnace are not shown, but it may be of the gas or electric type, or may simply be a coil carrying a high frequency current which induces a large heating current in the shell 1 and bottom part 2, and also in the metal supporting cylinder 21.

To exhaust the tube it is supported as shown in Fig. 3 with the outer shell 1 resting upon the support 21 and with the extension 14 of the bottom part 2 lowered, whereby the rim of the shell 1 is above the level of the broken pieces of glass 3 and 3a in the troughs formed in the bottom portion 2, thus separating the opening between the two parts of the shell. The bell 18 is placed over the tube and sealed to the base 19. By means of the pump 28 the bell and the tube are preliminarily exhausted. The furnace 48 surrounding the bell 18 is then heated to a temperature higher than the melting point of the glass. The only real limitation on the temperature is the melting point of the metal, although it is advisable to keep the temperature below the point at which the metal evaporates rapidly. A recommended degree of degassing in the case of the steel vessel is that produced when the vacuum is pumped to about $5 \times 10^{-3}$ millimeters of mercury while the vessel and its contents are heated to about 1000° C., which is the temperature at which steel begins to evaporate rapidly. If the parts are clean about a half hour is usually required to create this degree of vacuum.

During the heating and evacuating, the filament is preferably heated by applying a voltage across the terminals of the rods 37 and 40. The pumping is continued until the cathode coating material is "converted" and all surface and dissolved gas is removed. The term "converting" means placing the cathode coating material in its ultimate condition. For example, when barium carbonate is used to coat the cathode it is "converted" when it has been changed by the heat to barium oxide, and the carbon dioxide released thereby is drawn off. During this process the glass melts to a liquid filling within the troughs 3 and 3a of the dish and is thoroughly degassed by the high temperature at the high vacuum.

When the device is adequately degassed the temperature is lowered as much as possible while still maintaining the glass liquid. The pump is then shut off by operating valve 29. If the device is to contain a special gas filling such as argon for example, the correct amount of the gas is admitted to the vacuum chamber through a pipe 49 controlled by a valve 50. The cross head 26 is then raised by lever 46 a distance sufficient to raise the bottom 2 until the molten glass 3 surrounds and embeds the lower edge of the part 1 but not sufficient to cause the shell to contact with the metal trough. The position of the dish and shield, as thus elevated, is shown in Fig. 3 by dotted lines. When the shell rim is dipped into the molten glass the glass wets the metal parts and seals off the inside of shell 1 from the rest of the vacuum chamber.

The heat is then turned off entirely; and as the parts cool the glass sets, forming a strong vitreous seal.

When the evacuation is completed the set screw 36 is released and by turning the tube conductor 13 will be unscrewed from the contact block 34. The tube may then be withdrawn from its support. The tube is then suitably mounted to connect conductor 13 and sleeve 14 to the heating circuit. The cathode-anode circuit is established by connecting the part 1 with conductor 13 or with tube 14. Preferably part 1 serves as the anode; a suitable anode contact is shown at 51 in Fig. 2.

Part 52 represents a sealing compound which may be used, if desired, for protecting the glass from atmospheric moisture, or to prevent arcing when high voltages are applied to the electrodes.

I claim:

1. The method of evacuating and sealing a vessel having two complementary metal portions having registering surfaces, which comprises applying a vitreous substance to at least one of said surfaces, placing said portions somewhat apart in a vacuum chamber, heating said chamber sufficiently to melt said vitreous substance and simultaneously evacuating said chamber of gas, bringing said registering surfaces together with the molten vitreous substance therebetween, and then allowing said vessel to cool under vacuum to solidify said vitreous substance.

2. The method according to claim 1 in which the heating of said chamber is carried to a temperature of about 1000° C. and the simultaneous evacuating is carried to a pressure of about five times $10^{-3}$ millimeters of mercury.

3. The method of evacuating and sealing a vessel having a metal shell and a metal covering dish provided with a trough for receiving the rim of said shell, which comprises supporting said shell with the open end down and supporting said dish with the trough up, in a vacuum bell, placing a vitreous substance in said trough, heating the inside of said bell to a temperature above the melting point of said vitreous substance and applying an evacuating pressure, bringing said rim within said trough so that said rim dips into the molten vitreous substance, and allowing said vessel to cool whereupon said vitreous substance solidifies, forming a seal.

4. The method of evacuating and sealing a metal vacuum tube having a metal vessel member and a metal cover, one of said members having a trough for receiving a rim of the other of said members, which comprises supporting in a vacuum chamber the member having the trough with the trough up, supporting in the vacuum chamber above said trough the other member with the rim down, placing a vitreous substance in said trough, heating said members to a temperature of about 1000° C. and thus melting the vitreous substance in the trough, evacuating to a vacuum pressure of about 5 times $10^{-3}$ millimeters of mercury at that temperature, dipping said rim into the molten vitreous substance and then cooling said substance under vacuum, until said substance solidifies, forming a seal.

DONALD V. EDWARDS.